United States Patent [19]

Kalden

[11] 4,104,611
[45] Aug. 1, 1978

[54] SUPPRESSING CONSTANT FREQUENCY NOISE IN SEISMIC RECORDS

[75] Inventor: Adrianus B. Kalden, Rijswijk, Netherlands

[73] Assignee: Shell Oil Company, Houston, Tex.

[21] Appl. No.: 789,461

[22] Filed: Apr. 21, 1977

[30] Foreign Application Priority Data

Apr. 4, 1976 [GB] United Kingdom ............... 18185/76

[51] Int. Cl.$^2$ .......................................... G01V 1/36
[52] U.S. Cl. ...................... 340/15.5 F; 340/15.5 TD; 340/17 R; 324/1
[58] Field of Search ................... 340/15.5 CP, 15.5 F, 340/15.5 TD, 15.5 AF, 17 R; 328/162, 165, 166; 187/108; 324/1

[56] References Cited

U.S. PATENT DOCUMENTS

| | | | |
|---|---|---|---|
| 2,294,627 | 9/1942 | Parr | 340/15.5 F |
| 2,733,412 | 1/1956 | Alexander et al. | 340/15.5 F |
| 3,223,967 | 12/1965 | Lash | 340/15.5 TD |
| 3,419,846 | 12/1968 | Michon | 340/15.5 F |
| 3,447,126 | 5/1969 | Reid | 340/15.5 F |
| 3,633,117 | 1/1972 | Reilly | 328/166 |
| 3,757,235 | 9/1973 | McCormick et al. | 328/166 |
| 3,786,409 | 1/1974 | Sorkin | 340/15.5 CC |
| 3,889,229 | 6/1975 | Kostelnicek et al. | 328/165 |
| 4,034,333 | 7/1977 | Cunningham | 340/15.5 F |
| 4,059,818 | 11/1977 | Kostelnicek | 328/165 |

*Primary Examiner*—Nelson Moskowitz

[57] ABSTRACT

A method and apparatus for removing a sinusoidal noise signal having constant amplitude and phase from a seismic signal. The noise signal is continuously monitored to detect its phase and zero crossing of the noise signal to generate first and second trigger signals. The trigger signals are used to control the recording of seismic signals resulting from consecutive firings of a seismic source. Then, depending upon the polarity of the seismic source, the recorded signals are either added or subtracted to remove the unwanted noise signal.

12 Claims, 5 Drawing Figures

FIG. 1
FIG. 2
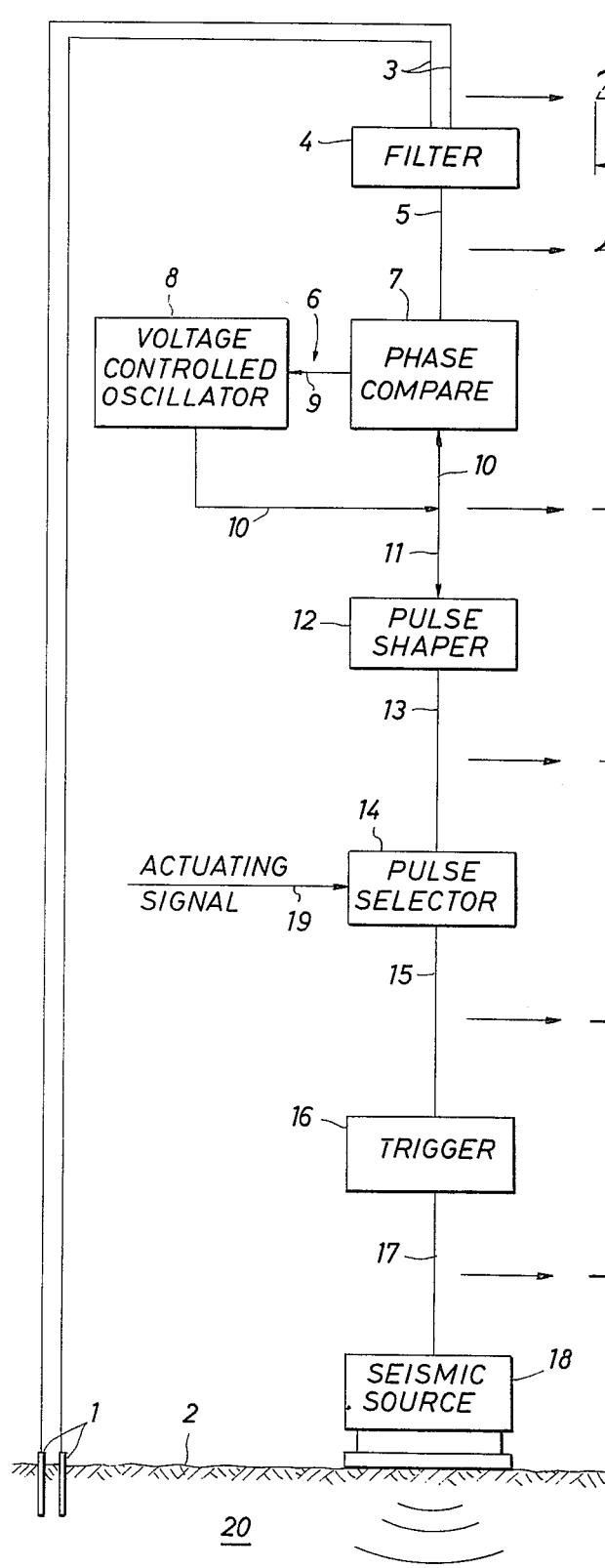
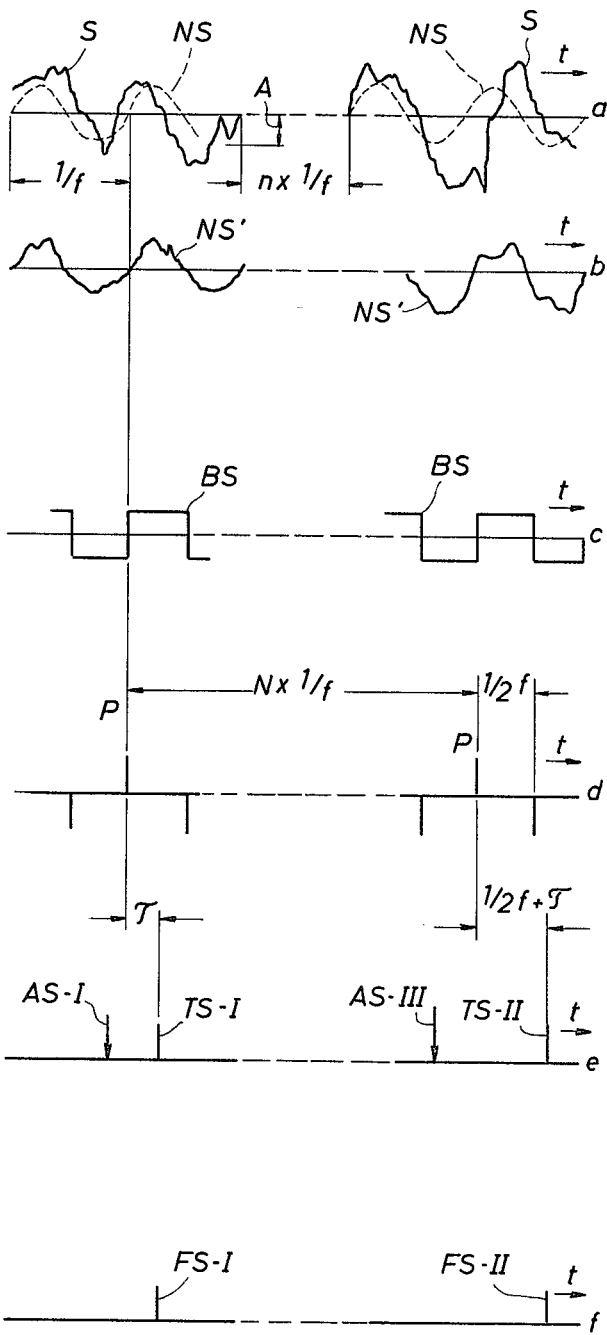

SUPPRESSING CONSTANT FREQUENCY NOISE IN SEISMIC RECORDS

BACKGROUND OF THE INVENTION

The invention relates to equipment and a method for removing an unwanted noise signal and harmonics thereof from electric signals obtained through a measuring operation, such as a seismic operation.

In particular, the invention relates to equipment and a method for removing a sinusoidal noise signal of substantially constant frequency and amplitude from a measured electric signal. Such type of noise signal often results from the occurrence of stray electric currents at the site where the measurements are being carried out. The noise is a particular nuisance where low-energy signals are being measured, or when taking measurements in the vicinity of industrialized areas where high-energy power lines and electric equipment are present, or in the neighborhood of electric railway tracks. The magnetic fields created by such currents induce an electric noise signal in the measuring equipment and electric cables attached thereto. The noise signal is recorded together with the signals resulting from the measuring operation and it is not possible to remove the noise signal from the recorded signals by known filtering methods without, at the same time, degrading the signals that are to be measured.

Apart from the electric noise signal resulting from alternating magnetic fields, electric stray currents can be expected to enter the measuring system directly. This will occur where measuring cables are in contact with moisture-containing earth as often happens when electric cables having low-quality electric insulation are used in seismic measuring operations. These stray currents are detected together with the signals to be measured, thereby reducing the quality thereof.

It has been proposed earlier to remove sinusoidal noise signals of an unvarying frequency $f$ from seismic records by compounding N records resulting from seismic waves initiated at time intervals $K/f + 1/Nf$ (wherein K is an integer). Compounding these records will, in theory, remove the sinusoidal noise signal by an integration operation (since—as known—addition of N sinusoidal voltages of the same amplitude and frequency, and phase-shifted with reference to one another by an angle equal to $4\pi/N$ produces a resultant equal to zero).

Such integration technique for suppressing a sinusoidal noise signal, however, has only been found suitable to partially remove the noise signals that seismic operators have to face in the field.

BRIEF SUMMARY OF THE INVENTION

An object of the invention is now a technique which enables complete removal of a noise signal of sinusoidal character and harmonics thereof from electric signals obtained through a measuring operation.

Another object of the invention is a method and equipment for suppressing a noise signal from electric signals obtained through a measuring operation, in a simple and efficient manner, which requires only a limited amount of electric signals that are to be combined together for removal of the undesired sinusoidal noise signal and harmonics thereof.

The equipment, according to the invention, comprises means for monitoring the noise signal and detecting the phase pattern thereof, trigger means for starting the measuring operation, and means for generating at least a first and a second trigger signal to the trigger means at predetermined time intervals after a first and a second zero crossing or passage of the noise signal, these crossings being separated in the time by at least a plurality of periods of the noise signal.

Each of the time intervals may be smaller than half the period of the noise signal while the time intervals may be equal to each other (e.g., each may be equal to zero).

The first and the second zero crossings may be separated by N periods or by (N + ½) periods of the noise signal, wherein N is an integer.

The method, according to the invention, comprises the steps of continuously monitoring the noise signal for detecting the phase pattern thereof, generating a first trigger signal and a second trigger signal at predetermined time intervals after a first and a second zero crossing of the noise signal, respectively, which crossings are separated in the time by at least a plurality of periods of the noise signal, starting the measuring operation by means of the said trigger signals, measuring the electric signals, and generating the record by combining the electric signals such that the first and the second trigger signal coincide.

The first and the second zero crossings may be separated by (N + ½) periods of the noise signal (N being an integer); the record is then generated by addition of the measured signals.

When input signals are used in the measuring operation for generating the electric signal, the first and the second zero crossings may be separated by N periods of the noise signal (N being a integer). The input signals raised by the first and the second trigger signal, respectively, should then have the same shape but reversed polarity, and the measured signals are subtracted from each other for generating the record.

The invention will hereinafter be described by way of example in more detail with reference to two seismic techniques. It will be understood, however, that application of the invention is not limited to the two techniques described, or to seismic techniques in general. The invention may also be applied to other methods for prospecting subsurface earth layers, such as those techniques wherein natural or artificial electric and/or magnetic fields are being measured. The artificially-raised fields may have either a harmonic or pulse-shaped character. Further, the invention may be applied for generating records of any other type of measured electric signal, in particular of those of low energy, such as the pulse response signals that are being measured under laboratory conditions where 60 Hz interference occurs.

BRIEF DESCRIPTION OF THE DRAWINGS

The invention will be more easily understood from the detailed description of two embodiments of the invention when taken in conjunction with the attached drawings, wherein:

FIG. 1 schematically shows the arrangement of equipment for monitoring the noise signal for detecting the phase pattern thereof and generating trigger signals for activating a seismic source;

FIG. 2 schematically shows, graphically, in time-relationship, the various signals (a–f) passing through the equipment of FIG. 1;

PREFERRED EMBODIMENTS

Figure 3:
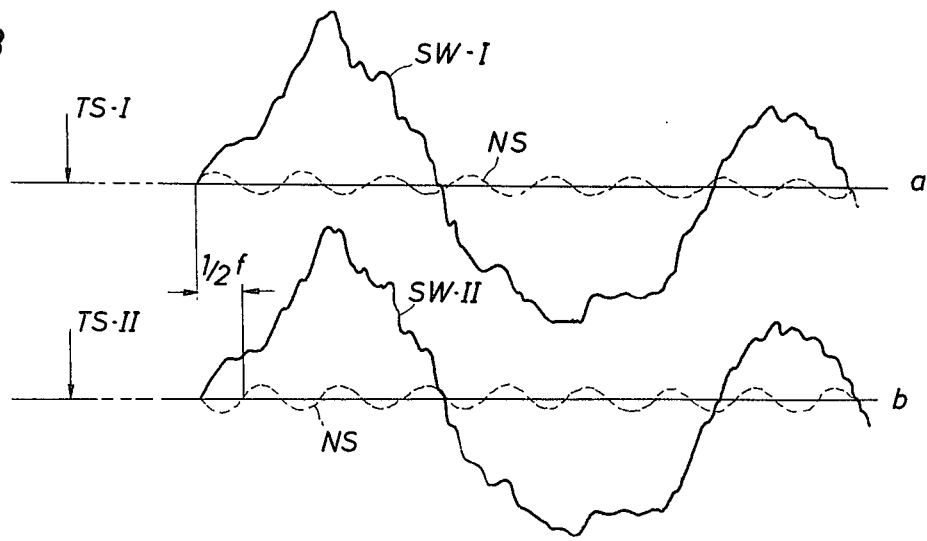
FIG. 3 shows the waves (a) and (b) received by seismometers, the waves (a) and (b) being displayed in relationship to time $t$.

The equipment, shown in FIG. 1 of the drawing, comprises a pair of ground electrodes 1 located in the ground 2, at or near the site where the seismic operations are being carried out. The electrodes are connected via electric cables 3 to a filter 4, which is a narrow band filter through which only a narrow frequency band containing the undesired noise signal of frequency $f$ is allowed to pass.

Subsequently, the filtered signal is passed from the filter 4 through cable 5 to phase lock means 6, consisting of a phase comparator 7 and a voltage-controlled oscillator 8. Such phase lock means is of known design and does not require a detailed explanation of its construction and mode of operation. The outgoing signal of the phase comparator 7 is passed on through a cable 9 to the input of the voltage-controlled oscillator 8, and the outgoing signal of the oscillator 8 is fed back through cable 10 to the phase comparator 7 and at the same time supplied through cable 11 to a pulse shaper 12. The pulses from the pulse shaper 12 are supplied through a cable 13 to a pulse selector 14, which can generate a trigger signal. The trigger signal is passed through cable 15 to trigger means 16 adapted for generating a firing signal on receipt of such trigger signal, which firing signal is then passed through a cable 17 to a seismic wave source 18. The trigger signals are generated by pulse selector 14 in a predetermined time relationship to signals passed on to selector 14 through a cable 19, and to pulses received from pulse shaper 12, as will be explained hereinafter.

Reference is now made to FIG. 2 of the drawing, wherein the various signals that pass through the equipment of FIG. 1 are shown in relationship with time $t$. Each graph 2a, 2b, 2c, 2d, 2e and 2f, shows two segments of a signal, which segments are separated in time over at least a plurality (n) of periods (1/f) of the noise signal having frequency $f$.

A signal S, shown in FIG. 2a, is picked up by the ground electrodes 1. This signal contains the periodic noise signal NS (see dotted line in FIG. 2a), which is of substantially sinusoidal character and of approximately constant frequency $f$ and amplitude A.

A narrow bank of frequencies containing this noise signal NS is separated from the signal S by means of the narrow band filter 4 and the signal NS' thus obtained is shown in FIG. 2b. By passing this latter signal through the phase lock means 6, a block-shaped signal BS (see FIG. 2c) is obtained, which is in phase with respect to the signals NS' and to NS. Signal BS is subsequently passed through the pulse shaper 12, which results in a plurality of positive and negative pulses P (see FIG. 2d) that correspond with the upsweep and the downsweep parts, respectively, of the zero crossings of the signal according to FIG. 2c.

The pulses P are passed to the pulse selector 14, which selector will relay a trigger signal TS-I (see FIG. 2e) a predetermined time I after a positive pulse P directly following an activating signal AS-I that has been supplied via the line 19 to the pulse selector 14. This activating signal AS-I is a pulse signal that is either directly being supplied by a seismic operator or indirectly, by an electric activation circuit (not shown) connected to the seismic recording means.

As shown in FIG. 2e, a second trigger signal TS-II is generated in a similar manner as described with reference to trigger signal TS-I, with the difference, however, the TS-II is a predetermined time $(\tau + \frac{1}{2}f)$ after the pulse P following the activating signal AS-II.

Each signal TS-I and TS-II is supplied via the cable 15 to the trigger means 16 wherein firing signals FS-I and FS-II are generated (see FIG. 2f), which each have a fixed time relationship with the signal TS by which it is raised, and consequently, also have a predetermined time relationship with the positive pulse P directly preceding the firing signal, and consequently, also with the zero crossing of the noise signal NS which zero crossing directly precedes the said pulse P. The signals FS are supplied through the cable 17 to the seismic source 18, which upon activation, generates seismic waves 20 in the subsurface. The seismic waves are reflected or refracted by subsurface layers and received by wave measuring means (not shown) that are activated by the trigger signals of the trigger means 16. The measured electric signals are stored thereupon for later treatment (such as computer processing, plotting and interpretation) and study.

The time period extending between the two positive pulses P directly preceding the signals FS-I and FS-II (see FIGS. 2d-f) is N-times the period of the noise signal NS (and thus, equal to N + 1/f). This time period should be sufficiently long to prevent overlap of the periods over which the seismic wave measuring means, such as geophones (not shown), are receiving the seismic waves resulting from the seismic waves generated by the seismic source 18 on being activated by the firing signals FS-I and FS-II, respectively.

It will be appreciated that the measured reflected (or refracted) seismic waves SW-II (see FIG. 3b) resulting from the activation of the source 18 by the firing signal FS-II include the noise signal NS just as the measured reflected waves SW-I (see FIG. 3a) resulting from the activation of the source by the firing signal FS-I. However, since TS-II has been generated a time period $(\tau + \frac{1}{2}F)$ after the positive pulse P preceding TS-II, and TS-I a time period $\tau$ after the positive pulse P preceding TS-I, there will exist a phase difference of $\pi$ radians with respect to the firing signals FS-I and FS-II between the waves of the noise signal NS present in the reflected waves SW-I and SW-II. Thus, when adding the signals SW-I and SW-II with trigger signals TS-I and TS-II, and consequently, firing signals FS-I and FS-II coinciding (see FIGS. 3a and 3b), the resulting record (not shown) of the measured signal will no longer contain the noise signal NS. It will be appreciated that this applies too for the odd harmonics of the noise signal NS.

In an alternative manner, the noise signal (including the odd harmonics thereof) may be removed by the technique described with reference to FIGS. 1–3, but having one of the firing signals FS-I or FS-II suppressed. Thus, by suppressing FS-II, the noise signal NS of FIG. 3b is added to the seismic wave SW-I which includes the noise signal NS that is phase-shifted $\pi$ radians with respect to the noise signal in FIG. 3b, and the resulting record of the measured signal will be free from the noise signal including its odd harmonics.

The time period $\tau$ (see FIG. 2e) will mostly be chosen smaller than half the period of the noise signal (thus, $\tau$ < ½f). If desired, the first and the second trigger signals may be generated a time period τ after a positive pulse P and a negative pulse P, respectively. The positive pulse P is the first positive pulse generated after the activating signal AS-I has been supplied to the pulse selector 14, and the negative pulse P is the first negative pulse appearing after the activating signal AS-II has been supplied to the pulse selector 14. In case τ = 0, then the pulse selector 14 will generate a first firing signal FS-I on a positive pulse P, and a second firing signal FS-II on a negative pulse P. Alternatively, the first firing signal FS-I may be raised at a negative pulse P, whereas the second firing signal FS-II is consequently generated at a positive pulse P.

Any electronic circuit suitable may be used to generate such firing signals FS-I and FS-II either at separate activating signals AS-I and AS-II, or at a single activating signal AS-I. Numerous circuits are possible, and therefore, no specific details of the pulse selector 14 are given here.

The time period extending between the activation signals FS-I and FS-II is preferably as short as possible without interference occurring between waves SW-I and SW-II that are measured or detected by the seismic receival means. By choosing this time period sufficiently short, the chance of a variation in the amplitude of the noise signal NS is smallest. Any change in phase of the noise signal NS occurring in this time period is compensated by the fixed relationship existing between the firing signals FS and the zero crossings of the noise signal since, as can be seen from FIG. 2, there is a fixed time interval of τ seconds between signal FS-I and a zero crossing of the noise signal, and a fixed time interval of (τ + ½f) seconds between FS-II and a zero crossing of the noise signal. Each zero crossing is a zero crossing of an upsweep part of the noise signal, and directly precedes the relevant firing signal FS.

It will be understood that the phase relationship between the noise signal NS and the block signal BS formed by the phase lock means 6 may be different from the one shown in FIGS. 2b and 2c. Independent of the relationship chosen, however, there will be a fixed phase shift between the two signals, that will not vary over the time, and consequently, the trigger signal TS-I will be formed a predetermined time interval after the preceding upsweep zero crossing of the noise signal, which time interval differs ½f seconds from the time interval existing between the trigger signal TS-II and the preceding upsweep zero crossing of the noise signal. As a result of this ½f seconds time difference, the noise wave will be cancelled when adding the measured seismic waves SW-I and SW-II such that the firing signals or the trigger signals thereof coincide. It will be appreciated that the seismic waves may either be combined in the time domain or in the frequency domain.

Detection of the noise signal is obtained in the example described with reference to FIG. 1 by means of ground electrodes 1. Alternatives of this detection technique are the use of the seismic wave detection means which are electrically connected to the cables 3. In the alternative, a detector that is coupled to the source of the noise wave, either through intermediary of cables 3 or through intermediary of radio link may be used. When a radio link is used, the signal are received by a radio receiver coupled to the cables 3, which receiver receives radio waves on which the noise signal is modulated at a location where the phase of the noise signal can be measured easily.

The filter 4 and the phase lock means 6 (shown by way of example in FIG. 1 of the drawings) may be omitted in case the phase pattern of the noise signal is detected directly at the source of this noise signal. It will be appreciated that in this case the noise signal can be supplied directly to the pulse shaper 12.

The seismic source 18, shown in FIG. 1, may be any source suitable for the purpose, such as an explosive source, an air gun, a weight dropped and a Vibroseis ®. This latter source is a transducer positioned to transmit a mechanical vibratory signal (which may be of a continuously varying frequency) to the earth.

Figure 4:
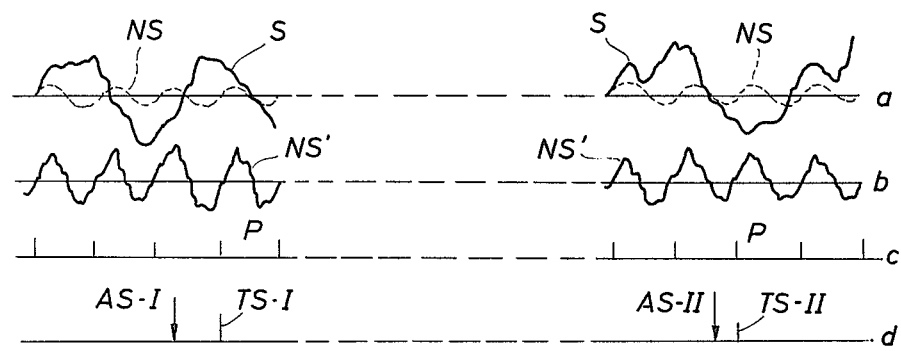
FIG. 4 shows schematically, in time-relationship, the various signals that are used in another embodiment of the invention.
Figure 5:
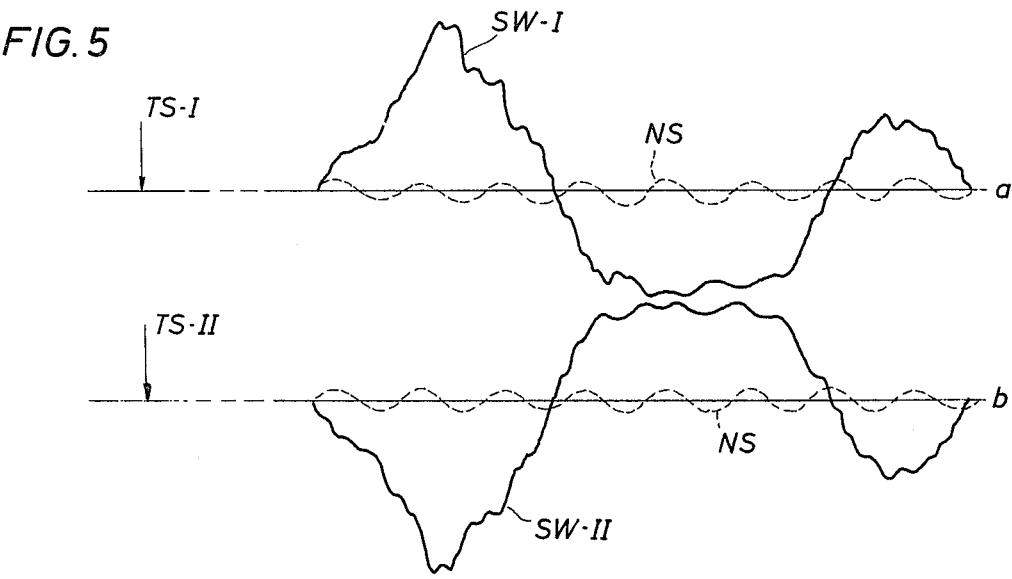
FIG. 5 shows the waves (a) and (b) received in relationship to time t by seismometers in the embodiment of the invention described with reference to FIG. 4.

When applying an explosive source, the two shot holes used should be relatively close to each other (say about 0.5–100 meters). The other sources may be used repeatedly at the same location, or at about the same location. When applying a Vibroseis ®, the polarity of the signal may be reversed. Such reversal of polarity of the wave signals that are transmitted to the earth as a result of activating signals AS-I and AS-II will allow suppression of the noise signal including all harmonics thereof as will be explained now with reference to FIGS. 4 and 5 of the drawings.

The signal S, shown in FIG. 4a, in relationship with time t is picked up by detecting means, such as ground electrodes, and passed through a narrow bank filter to separate therefrom (see FIG. 4b) a sinusoidal character and substantially constant frequency and amplitude. In FIGS. 4a and 4b, as well as in the other FIGS. 4c and 4d, two sections of the relevant signals are shown, these sections being sufficiently separated in time to allow seismic signals that are consecutively being transmitted to the earth by the Vibroseis ®, to be detected and measured by wave receival means (such as seismometers) without interference therebetween.

The signal NS' is passed through a phase detecting means and a pulse shaper, which latter forms positive pulses P (see FIG. 4c) coinciding with the upsweep zero crossings of the noise signal NS. The pulses P are passed through a pulse selector, which relays a trigger signal TS coinciding with the first pulse P occurring after an activating signal has been supplied to the pulse selector. Thus, trigger pulses TS-I and TS-II are formed as a result of activating signals AS-I and AS-II, respectively. These trigger pulses are supplied to the Vibroseis ® and each pulse starts a wave train of continuously changing frequency that is transmitted to the earth. The wave trains raised by consecutively occurring trigger pulses are identical apart from the polarity thereto (which is reversed for even trigger signals, such as TS-II) with respect to odd trigger signals (such as TS-I). Consequently, the measured reflected wave signals resulting from the Vibroseis ® signals will be identical to each other, apart from the polarity thereof. However, the sections of the noise signals that are being received by the detector means together with the reflected signals will be in phase with each other when related to the trigger signals TS-I and TS-II (see FIGS. 5a and 5b), since each of the trigger signals TS coincides with an upsweep zero crossing of the noise signal. Now, by subtracting the wave signals SW-I and SW-II (shown in FIGS. 5a and 5b, respectively) that have been consecutively received by wave detector means, the noise signal parts NS in the wave signals will be cancelled and the resulting record of the wave signal will be free of the noise signal, including odd and even harmonics thereof.

Although the noise signal can be cancelled from the seismogram by combining two wave signals that have been obtained as a result of two consecutive operations of a seismic source at the same (or substantially the same) location, it will be appreciated that—if such would be desired—any even number of wave signals may be taken from one and the same subsurface area, which wave signals are combined in a later stage to form a single seismogram. When applying the technique of the present invention, the wave signals should be obtained in pairs having a short time period between the signals of each pair (which period, however, is sufficiently long to prevent interference of the signals during receival thereof by the seismometer). The plurality of wave signals may first be combined pairwise after which all the results thus obtained may be added, or all the wave signals may be combined in a single operation to obtain a seismogram.

Also, each wave signal obtained as a result of a separate operation of the seismic source, may be combined with the other wave signals resulting from preceding operations of the seismic source at the same (or substantially the same) location. The last arrived signal should either be added (in the technique described with reference to FIGS. 1-3) to the earlier wave signals, or alternately be added or subtracted (in the technique described with reference to FIGS. 4 and 5) to the earlier wave signals. In both cases, the trigger signals (and consequently, the firing signals) of all wave signals should coincide.

The degree to which the noise signal is eliminated from the final record will be influenced by variations in the amplitude of the noise signal, which variations may be found to occur under certain conditions over successive measuring periods. Such influence can be eliminated (in case the final record is found to give unreliable data) by monitoring the noise signal in one of the manners described above, and by detecting the amplitude pattern of this signal over each measuring period, and continuously calculating the values of the ratio in which the amplitude varies over each period from a fixed value. Subsequently, the electric signal measured over each period is magnified by the reverse of the said values. Thereby, the wave signals in the various electric signals will be fully cancelled when generating the desired record by combining the electric signals thus magnified. Magnification of the electric signals may be undertaken over each measuring period, or at any other moment prior to generating the desired record.

Although both examples described hereinabove refer to equipment and methods designed for removing undesired sinusoidal noise signals from records of seismic signals, it will be appreciated that the equipment and methods can be applied with equal success to measuring techniques in other fields. It will further be clear that the technique described with reference to FIGS. 4 and 5 of the drawings, can only be applied in case where the electric signals obtained during the measuring operation are the result of input signals that have reversed polarity.

The trigger signals that initiate or start the measuring operation may be active signals, such as when generating firing signals in the embodiments described with reference to the drawings, or be reference signals. The latter is the case where the measuring operation does not need any special activation (such as input signals for generating the electric signals) as the signal to be measured is continuously being generated.

I claim as my invention:

1. An apparatus for removing an unwanted sinusoidal noise signal having constant frequency and amplitude from a seismic signal, said apparatus comprising:
    monitoring means for monitoring the noise signal and detecting the phase pattern thereof;
    a pulse selector circuit, said pulse selector circuit being coupled to said monitoring means to produce first and second trigger signals in response to first and second zero crossings of said noise signal and an actuating signal; said trigger pulses being separated by at least a plurality of periods of the noise signal;
    a trigger circuit, said trigger circuit being coupled to said pulse selector circuit; and
    a seismic source, said trigger circuit being coupled to said seismic source to fire said source in response to said first and second trigger pulses.

2. The apparatus of claim 1 wherein said first and second trigger pulses are produced at predetermined time intervals after first and second zero crossings of the noise signal.

3. The apparatus of claim 2 wherein said time intervals are equal.

4. The apparatus of claim 3 wherein said time intervals are less than one-half the period of the noise signal.

5. The apparatus of claim 1 wherein the first and second zero crossings are separated by a plurality of periods of the noise signal plus a half period.

6. The apparatus of claim 1 wherein said monitoring means comprises a pickup means for detecting the noise signal, a filter means coupled to the pickup means for removing all frequencies other than the noise signal, a phase lock means coupled to the filter means for phase locking the filtered signal, and a pulse-shaping circuit coupled to the phase lock means for producing pulses having a fixed time relationship with the zero crossings of the noise signal; said pulse-shaping circuit being coupled to said pulse selector circuit.

7. The apparatus of claim 6 wherein said pulse selector circuit includes means for producing said first and second trigger signals a predetermined time after the first pulse received from said pulse-shaping circuit after said pulse selector circuit receives an activation signal.

8. A method for removing an unwanted noise signal from a seismic record, said noise signal being a sinusoidal signal having a constant frequency and phase, said method comprising:
    monitoring the noise signal to detect its phase pattern;
    generating first and second trigger signals at predetermined time intervals after first and second zero crossings of the noise signal;
    initiating the recording of the seismic data in response to said trigger signals; and
    producing the seismic record by combining the records produced in response to said first and second trigger signals such that the first and second trigger signals coincide.

9. The method of claim 8 wherein each of the predetermined time intervals is less than a period of the noise signal.

10. The method of claim 9 wherein the time intervals are equal.

11. The method of claim 8 wherein the first and second zero crossing are separated by $(N + \frac{1}{2})$ periods of the noise signal where N is an integer and the seismic record is produced by adding the records.

12. The method of claim 8 wherein the noise signal is monitored by placing a pair of electrodes in contact with the ground.

* * * * *